United States Patent
Richards et al.

(10) Patent No.: US 9,454,647 B1
(45) Date of Patent: Sep. 27, 2016

(54) MANAGING ASSETS ON A COMPUTING DEVICE

(75) Inventors: Duane Richards, Cedar Hills, UT (US); Shane Beech, Herriman, UT (US)

(73) Assignee: Crimson Corporation, Dover, DE (US)

( * ) Notice: Subject to any disclaimer, the term of this patent is extended or adjusted under 35 U.S.C. 154(b) by 479 days.

(21) Appl. No.: 12/787,641

(22) Filed: May 26, 2010

(51) Int. Cl.
*G06F 21/00* (2013.01)
*G06F 17/30* (2006.01)
*G06F 21/10* (2013.01)
*G06F 21/12* (2013.01)
*G06F 21/36* (2013.01)
*G06F 21/16* (2013.01)
*G06F 21/56* (2013.01)
*G06F 17/50* (2006.01)

(52) U.S. Cl.
CPC ......... *G06F 21/10* (2013.01); *G06F 17/30867* (2013.01); *G06F 17/5054* (2013.01); *G06F 21/105* (2013.01); *G06F 21/121* (2013.01); *G06F 21/123* (2013.01); *G06F 21/16* (2013.01); *G06F 21/36* (2013.01); *G06F 21/567* (2013.01)

(58) Field of Classification Search
CPC .. G06F 17/30; G06F 17/30569; G06F 21/10; G06F 21/105; G06F 21/121; G06F 21/123; G06F 21/16; G06F 21/36; G06F 21/567; G06F 17/5054; G06F 17/30867
USPC ........ 707/790–795, 797, 802, 804–805, 809; 345/619, 650, 676, 713; 715/736, 734, 715/737, 751, 841, 837
See application file for complete search history.

(56) References Cited

U.S. PATENT DOCUMENTS

| | | | | |
|---|---|---|---|---|
| 5,553,218 A * | 9/1996 | Li et al. | | |
| 5,627,979 A * | 5/1997 | Chang et al. | .................. | 715/763 |
| 5,956,039 A * | 9/1999 | Woods | .............. | G06F 17/30902 |
| | | | | 345/419 |
| 6,049,789 A * | 4/2000 | Frison et al. | ..................... | 705/59 |
| 6,222,533 B1 * | 4/2001 | Notani et al. | .................. | 715/733 |
| 6,295,527 B1 * | 9/2001 | McCormack et al. | | |
| 6,658,586 B1 * | 12/2003 | Levi | .............................. | 714/4.3 |
| 6,708,187 B1 * | 3/2004 | Shanumgam et al. | | |
| 6,754,637 B1 * | 6/2004 | Stenz | ................. | G06Q 10/0837 |
| | | | | 705/26.1 |
| 6,915,298 B1 * | 7/2005 | Cain et al. | | |
| 7,272,531 B2 * | 9/2007 | Kavaklioglu et al. | ........ | 702/182 |
| 2002/0073329 A1 * | 6/2002 | Brombal | ....................... | 713/200 |
| 2002/0154157 A1 * | 10/2002 | Sherr | ...................... | G06F 21/10 |
| | | | | 715/716 |
| 2003/0028451 A1 * | 2/2003 | Ananian | ........... | G06F 17/30867 |
| | | | | 705/26.42 |

(Continued)

FOREIGN PATENT DOCUMENTS

WO          WO00/65519          *   4/2000

*Primary Examiner* — Srirama Channavajjala
(74) *Attorney, Agent, or Firm* — Austin Rapp & Hardman

(57) ABSTRACT

Systems and methods for managing assets on a computing device are described. A computing device obtains one or more relationships between an electronic device and one or more related electronic devices. Relationship priorities of the relationships are obtained. The computing device displays an icon representing the electronic device and icons representing the related electronic devices. Also displayed are arrows representing the relationships. The arrows are displayed with differing thicknesses based on the relationship priorities.

27 Claims, 12 Drawing Sheets

(56) References Cited

U.S. PATENT DOCUMENTS

| | | | | |
|---|---|---|---|---|
| 2003/0046421 A1* | 3/2003 | Horvitz et al. | | 709/238 |
| 2004/0024660 A1* | 2/2004 | Ganesh | | G06Q 10/087 705/28 |
| 2004/0056904 A1* | 3/2004 | Jaeger | | G06F 3/0481 715/853 |
| 2004/0268120 A1* | 12/2004 | Mirtal | | G06F 21/10 713/156 |
| 2005/0131970 A1* | 6/2005 | Salazar | | G06F 17/30569 |
| 2006/0009944 A1* | 1/2006 | Shah | | G06F 9/44505 702/123 |
| 2006/0085242 A1* | 4/2006 | Mark | | 705/8 |
| 2006/0155564 A1* | 7/2006 | Fisher | | G06Q 10/06 705/7.11 |
| 2006/0229994 A1* | 10/2006 | Moulckers | | G06F 8/34 705/59 |
| 2006/0293942 A1* | 12/2006 | Chaddha | | G06Q 10/06 705/7.12 |
| 2007/0016870 A1* | 1/2007 | Doerr | | G06F 9/4443 715/764 |
| 2007/0240071 A1* | 10/2007 | Sherrill et al. | | 715/764 |
| 2008/0028218 A1* | 1/2008 | Simon | | 713/170 |
| 2008/0126317 A1* | 5/2008 | Stout | | G06F 8/447 |
| 2008/0183724 A1* | 7/2008 | Mueller | | 707/100 |
| 2008/0255902 A1* | 10/2008 | Poer | | G06Q 10/06 705/7.23 |
| 2009/0031286 A1* | 1/2009 | Yee et al. | | 717/120 |
| 2009/0144320 A1* | 6/2009 | Weinberg | | G06F 17/30595 |
| 2009/0248712 A1* | 10/2009 | Yuan | | 707/100 |
| 2009/0290716 A1* | 11/2009 | O'Connor | | G06F 21/10 380/278 |

* cited by examiner

MANAGING ASSETS ON A COMPUTING DEVICE

TECHNICAL FIELD

The present disclosure relates generally to computers and computer-related technology. More specifically, the present disclosure relates to managing assets on a computing device.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. On such a network, one or more servers may provide data and/or services for other computers. Those computers are often referred to as client nodes. A computer network may have hundreds or even thousands of client nodes.

Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly, computer software is also frequently upgraded or replaced. New computer hardware and software is continually being integrated into systems across the world.

When many assets (e.g., computers, electronic devices, etc.) are used in a business environment, it may be difficult to manage and track those assets. For example, it may be difficult for a manager or computer support personnel to quickly ascertain the number and kind of assets that a company owns. It may also be difficult to quickly ascertain relationships between the assets and other assets or people. For example, it may be difficult to quickly determine what hardware components are contained in a computer or who is currently assigned to a particular asset.

As shown from the above discussion, there is a need for systems and methods that will improve the ability to manage assets on a computing device. Improved systems and methods may help to satisfy this need.

DETAILED DESCRIPTION

Figure 1:
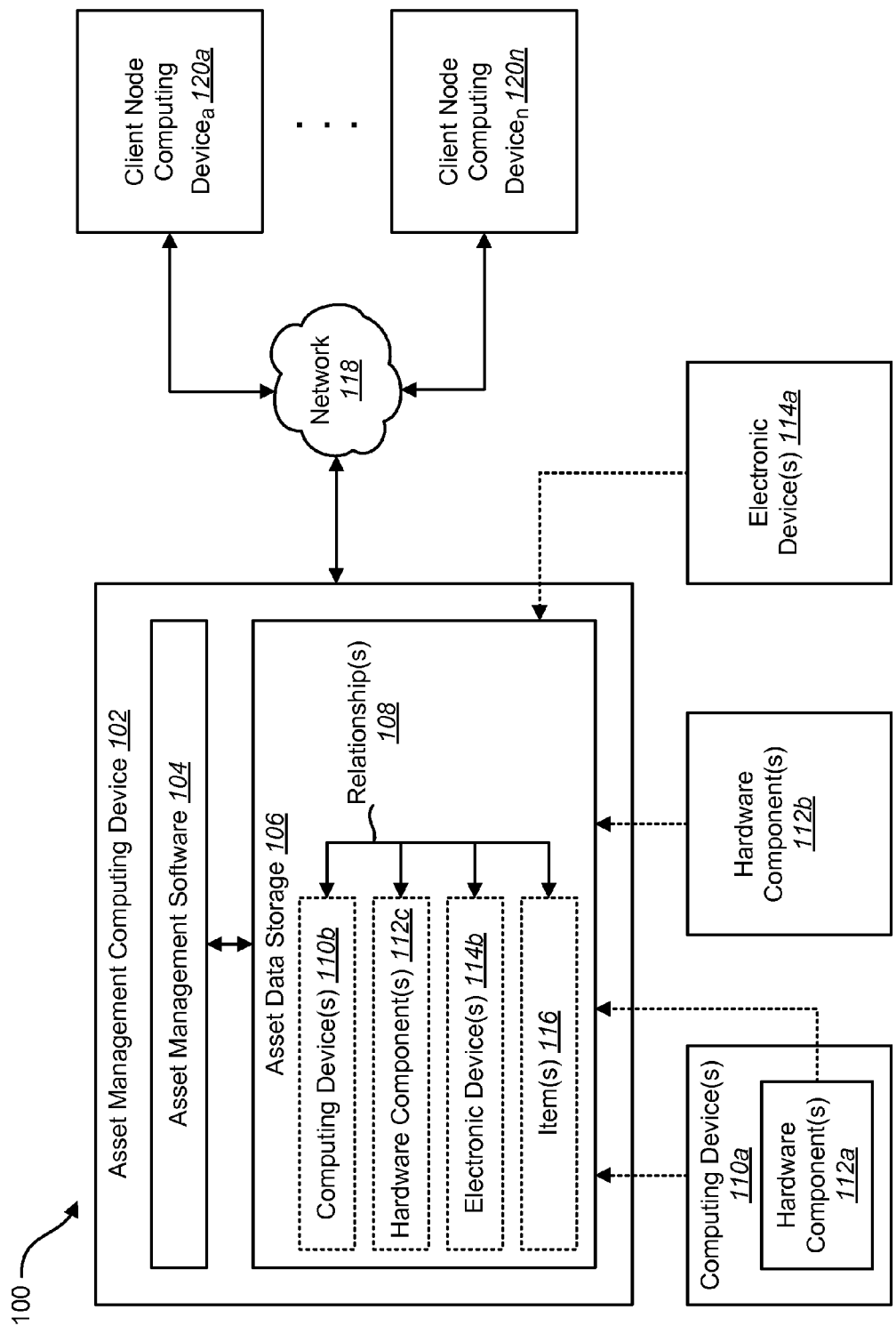
FIG. 1 is a block diagram illustrating one configuration of a system where a method for managing assets on a computing device may be implemented.

Asset management may be a complex system that requires tracking many physical assets, people, requests, etc. Users of asset management software may need to see how different assets in the system are related to other assets or people. For example, users may need to see what hardware components are associated with a computer, who has been assigned to a computer that has just been received, or what asset is being requested for purchase. In other words, users may need to see the relationships between assets and other assets or between assets and people. Some of these relationships may be of higher priority than others. Thus, users may need a way to set and view priorities for each relationship, and filter them while viewing. The systems and methods disclosed herein may display intuitive interactive graphical relationships between assets. These graphical relationships may be based on dynamically created relationships built into a form designer.

Other systems may provide tabular reports or hierarchical tree views showing a quasi-inheritance. Many may strictly display parent/child relationships but do not include any way to set and view priorities of those relationships. These systems may not have been previously applied to complete asset management systems to assist users in tracking asset relationships. However, a viewer disclosed by the systems and methods herein may graphically demonstrate how each object is related (e.g., parent/child) and how critical each relationship is. The systems and methods disclosed herein may also provide a user with the ability to hide or show different relationship priorities while maintaining the dynamic nature of a user-configured database schema as opposed to relying on a concrete pre-defined schema.

A method for managing assets on a computing device is disclosed. The method includes obtaining, by a computing device, one or more relationships between an electronic device and one or more related electronic devices and obtaining one or more relationship priorities of the one or more relationships. The method also includes displaying, by the computing device, an icon representing the electronic device, displaying one or more icons representing the one or more related electronic devices and displaying one or more arrows representing the one or more relationships. The one or more arrows are displayed with differing thicknesses based on the one or more relationship priorities.

The one or more arrows may be displayed between the icon representing the electronic device and the one or more icons representing the one or more related electronic devices. Each of the one or more relationship priorities may be selected from a group consisting of high, medium and low. Each of the one or more arrows may be displayed with a high thickness if a corresponding relationship priority is high, a medium thickness if a corresponding relationship priority is medium and a low thickness if a corresponding relationship priority is low.

The one or more arrows may point toward the icon representing the electronic device and away from the one or more icons representing the one or more related electronic devices if the electronic device is a child of the one or more related electronic devices. The one or more arrows may point away from the icon representing the electronic device and toward the one or more icons representing the one or more related electronic devices if the electronic device is a parent of the one or more related electronic devices.

The method may also include toggling the display of one or more of the one or more icons representing the one or more related electronic devices based on the one or more relationship priorities and toggling the display of one or more of the one or more arrows representing the one or more relationships based on the one or more relationship priorities. The icon representing the electronic device, the one or more arrows and the one or more icons representing the one or more related electronic devices may be displayed in a hub-and-spoke arrangement, where the icon representing the electronic device is displayed centrally and the one or more icons representing the related electronic devices are displayed peripherally with the one or more arrows being displayed between the icon representing the electronic device and the one or more icons representing the one or more related electronic devices.

The method may also include obtaining, by the computing device, data about the electronic device and displaying the data about the electronic device. The method may also include obtaining, by the computing device, data about the one or more related electronic devices and displaying the data about the one or more related electronic devices.

Another method for managing assets on a computing device is also disclosed. The method includes adding, by the computing device, one or more relational controls to a form definition and setting a relationship priority for each of the one or more relational controls. The method further includes passing the relationship priority for each of the one or more relational controls through the form definition and storing the form definition.

The method may also include generating a database schema based on the form definition and the one or more relational controls. Generating a database schema may include generating database tables based on the form definition and the one or more relational controls. Generating a database schema may include generating links between database tables based on the form definition and the one or more relational controls.

Another method for managing assets on a computing device is disclosed. The method includes obtaining, by the computing device, a form definition and determining relationships based on foreign keys. The method also includes obtaining relationship priorities from the form definition and sending relationships and relationship priorities.

A computing device that is configured for managing assets on a computing device is also disclosed. The computing device includes a processor and instructions stored in memory. The computing device obtains one or more relationships between an electronic device and one or more related electronic devices and obtains one or more relationship priorities of the one or more relationships. The computing device displays an icon representing the electronic device, displays one or more icons representing the one or more related electronic devices and displays one or more arrows representing the one or more relationships. The one or more arrows are displayed with differing thicknesses based on the one or more relationship priorities.

Another computing device that is configured for managing assets on a computing device is disclosed. The computing device includes a processor and instructions stored in memory. The computing device adds one or more relational controls to a form definition and sets a relationship priority for each of the one or more relational controls. The computing device also passes the relationship priority for each of the one or more relational controls through the form definition and stores the form definition.

Another computing device that is configured for managing assets on a computing device is disclosed. The computing device includes a processor and instructions stored in memory. The computing device obtains a form definition, determines relationships based on foreign keys, obtains relationship priorities from the form definition and sends relationships and relationship priorities.

A non-transitory tangible computer-readable storage medium for managing assets on a computing device is also disclosed. The computer-readable storage medium includes instructions for obtaining one or more relationships between an electronic device and one or more related electronic devices and obtaining one or more relationship priorities of the one or more relationships. Instructions are also included for displaying an icon representing the electronic device, displaying one or more icons representing the one or more related electronic devices and displaying one or more arrows representing the one or more relationships. The one or more arrows are displayed with differing thicknesses based on the one or more relationship priorities.

Another non-transitory tangible computer-readable storage medium for managing assets on a computing device is disclosed. The computer-readable storage medium includes instructions for adding one or more relational controls to a form definition and setting a relationship priority for each of the one or more relational controls. Instructions are also included for passing the relationship priority for each of the one or more relational controls through the form definition and storing the form definition.

Another non-transitory tangible computer-readable storage medium for managing assets on a computing device is disclosed. The computer-readable storage medium includes instructions for obtaining a form definition, determining relationships based on foreign keys, obtaining relationship priorities from the form definition and sending relationships and relationship priorities.

FIG. 1 is a block diagram illustrating one configuration of a system where a method for managing assets on a computing device may be implemented. An entity 100 (e.g., company, business, etc.) may include (e.g., own, lease, etc.) an asset management computing device 102 and several types of assets. For example, the entity 100 may include (e.g., own, lease, etc.) one or more computing devices 110*a*, one or more hardware components 112*a-b*, and/or one or more electronic devices 114*a*. Some hardware components 112*a* may be included within a computing device 110*a*, while other hardware components 112*b* may not be included within a computing device 110*a*. The asset management computing device 102 may be connected to a network 118. One or more client node computing devices 120*a*-*n* may also be connected to the network 118. The network 118 may facilitate communication between the asset management computing device 102 and the client node computing devices 120*a*-*n*. Examples of types of networks 118 include a Local Area Network (LAN) and the Internet. The entity 100 may or may not include some or all of the client node computing devices 120*a*-*n* and all or part of the network 118.

The asset management computing device 102 may be configured for managing (e.g., tracking) the assets of the entity 100. For example, the asset management computing device 102 tracks assets for a company. The asset management computing device 102 may accomplish this by storing and displaying data regarding the location (e.g., physical location, location on a network, status, etc.) of an asset, when the asset is acquired, and when the asset is disposed of. Assets may be, for example, devices and/or components that the entity 100 may consider purchasing, devices and/or components that the entity 100 owns, and/or devices and/or components that the entity 100 has disposed of. Assets may be computing devices 110*a*, hardware components 112*a*-*b*, and/or electronic device(s) 114*a*. Examples of assets include desktop computers, laptop computers, smart phones, cell phones, Personal Digital Assistants (PDAs), hard drives, optical drives (e.g., Compact Disc (CD), Digital Video Disc (DVD), Blu-Ray® drives, etc.), still cameras, video cameras, memory cards, monitors, network cards, video cards, sound cards, copiers, fax machines, scanners, Universal Serial Bus (USB) drives, projectors, televisions, CD players, DVD players, Blu-Ray® players, routers, switches, hubs, servers, game systems, computer mice, speakers, sound systems, audio mastering equipment, other electronic devices or components of electronic devices, etc. The asset management computing device 102 may additionally be configured to manage other items. For example, other items may be software, software licenses, usage records, notes, people, etc.

The asset management computing device 102 may include asset management software 104 and asset data storage 106. The asset data storage 106 may store data representing assets and their relationships with other assets or items. For instance, it 106 may store data representing one or more computing devices 110*b*, one or more hardware components 112*c* and/or one or more electronic devices 114*b*. Additionally, location data may be stored in the asset data storage 106 in order to track assets. Data representing other items 116 and relationships 108 may also be stored. The relationships 108 may link asset or item data instances. In one example, the relationships 108 link data representing a hard drive (e.g., a hardware component 112*c*) to data representing a desktop computer (e.g., a computing device 110*b*). In another example, relationships 108 link data representing a desktop computer (e.g., a computing device 110*b*) to a person (e.g., an item 116). The asset management computing device 102 may display asset and relationship information (e.g., using a web client). The asset management computing device 102 may also send asset and relationship information to the client nodes 120*a*-*n* for display. Additionally, the asset management computing device 102 may communicate with and receive asset data from the client nodes 120*a*-*n*.

Figure 2:
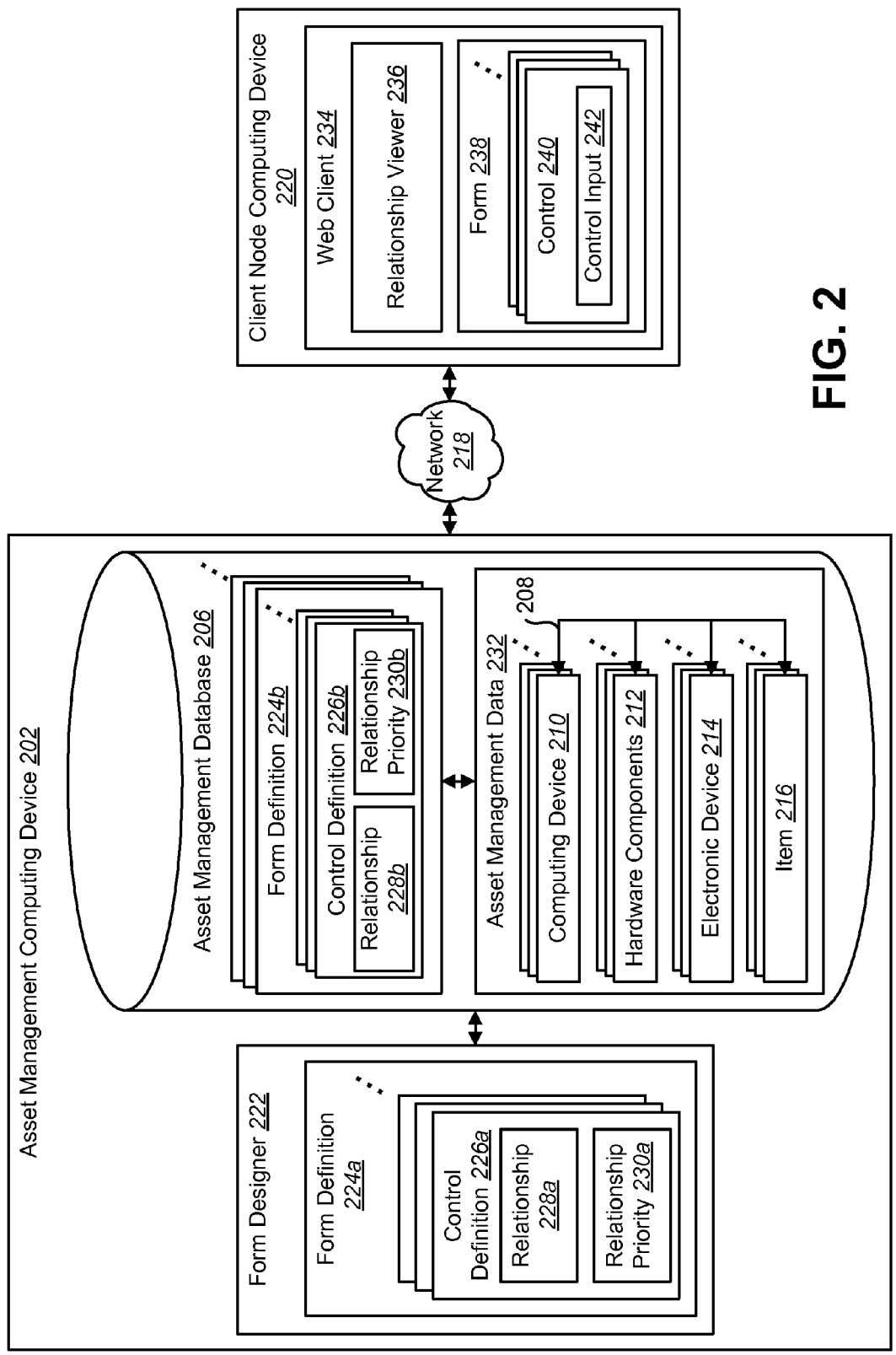
FIG. 2 is a block diagram illustrating an asset management computing device, a network, and a client node computing device.

FIG. 2 is a block diagram illustrating an asset management computing device 202, a network 218 and a client node computing device 220. The asset management computing device 202 may be a hardware and/or software module used for managing assets. For example, the asset management computing device 202 may be a server. The asset management computing device 202 may include a form designer 222 and an asset management database 206. The form designer 222 may be a hardware and/or software module used to design forms (e.g., user interfaces). For example, the form designer 222 may be used to design forms that may allow a user to input information. The form designer 222 may include a form definition 224*a*. The form definition 224*a* may define a form. More specifically, the form definition 224*a* includes information about a form and/or one or more control definitions 226*a* included in the form. Form characteristics (e.g., dimensions, styles, control locations, etc.) may also be included in the form definition 224*a*. Each form definition 224*a* may represent a type of asset.

Each control definition 226*a* may define a control. For example, a control definition 226*a* defines a control such as a text box, drop-down list, combo box, table, contact, calendar (or date), single record, one or more check boxes, one or more radio buttons, sliders, lists, buttons, etc. For instance, the contact control may be a Lightweight Directory Access Protocol (LDAP) control that allows a user to select a user record in the asset data storage 106 or in an Active Directory (AD). Each control definition 226*a* may represent an attribute of the type of asset represented by the form definition 224*a*. For example, an instance of a control definition 226*a* is used to input data about an asset represented by an instance of the form definition. The control definitions 226*a* may also represent types of related assets or items.

Control definitions 226*a* that represent a type of related asset or item may be deemed "relational controls" and may include a relationship 228*a* and a relationship priority 230*a*. The relationship 228*a* and relationship priority 230*a* may be attributes or fields of a control defined by the control definition 226*a*. For example, the relationship 228*a* defines a relationship between an asset type (i.e., represented by the form definition 224*a*) and an asset or item type represented by a control definition 226*a*. More specifically, if the form definition 224*a* represents desktop computers and a control definition 226*a* represents hard drives, then the relationship 228*a* defines a relationship between data representing desktop computers and data representing hard drives. The relationship priority 230*a* may define the priority of the relationship 228*a*. For example, the relationship priority 230*a* may be set to a low-priority relationship, a medium-priority relationship, or a high-priority relationship.

The asset management database 206 may store one or more form definitions 224*b*. In one configuration, each form definition 224*b* is stored in an Extensible Markup Language (XML) format. Each form definition 224*b* stored in the asset management database 206 may include one or more control definitions 226*b*. Each control definition 226*b* that is a "relational control" stored in the asset management database 206 may include a relationship 228*b* and a relationship priority 230*b*. Other control definitions 226*b* may not include a relationship 228*b* and a relationship priority 230*b*. For example, some single record controls, contact controls, table controls and/or combo box controls may be relational controls. However, some text box and integer controls, for example, may not be relational controls. The asset management database 206 structure may be based on the one or more form definitions 224*b*. More specifically, the asset management computing device 202 may generate a database schema based on the one or more form definitions 224*b*, including the one or more control definitions 226b. For example, the asset management computing device 202 may generate database 206 tables based on the one or more form definitions 224b and the one or more control definitions 226b. Furthermore, the asset management computing device 202 may generate links between tables or relationships 208 based on the one or more form definitions 224b (e.g., relationships 228b) and the one or more control definitions 228b.

The asset management database 206 may also store asset management data 232. The asset management data 232 may include data representing assets or items. For example, the asset management data 232 may include data representing one or more computing devices 210, one or more hardware components 212, and one or more electronic devices 214. The asset management data 232 may also include data representing other items 216, such as software licenses, notes, usage records, or people, etc. The relationships 228b stored as part of the control definitions 226b may indicate relationships 208 between pieces of asset management data 232. One example of a relationship 228b in the control definition 226b indicates a relationship 208 in the asset management data 232 between a computing device 210 and a hardware component 212. Another example of a control definition 226b relationship 228b may indicate an asset management data 232 relationship 208 between a person (e.g., an item 216) and a computing device 210.

The asset management computing device 202 may be connected to a network 218. A client node computing device 220 may also be connected to the network 218. The client node computing device 220 may be a hardware and/or software module that may communicate with the asset management computing device 202 and access and/or modify data stored on the asset management computing device. The client node computing device 220 may include a web client 234. The web client 234 may be a software and/or hardware module that includes a relationship viewer 236 and a form 238. The relationship viewer 236 and form 238 may be user interfaces (UIs). The relationship viewer 236 browses and displays asset and relationship data stored in the asset management database 206. For instance, the relationship viewer 236 provides a graphical interactive view of the asset management data 232. The form 238 may include one or more controls 240 and may be an instance of the form definition 224b that represents an asset.

Each of the controls 240 may be instances of the one or more control definitions 226b and may represent assets 210, 212, 214, items 216 or attributes of the asset represented by the form 238. Each control 240 may include a control input 242 that can be used to input asset or item data. For example, some controls 240 input data about the asset represented by the form 238. Other controls 240 input data about assets 210, 212, 214 or items 216 represented by control 240 instances. In one example, a control 240 is used to input that a particular desktop computer (e.g., computing device 210) was manufactured by a particular manufacturer. In another example, a control 240 is used to input that a hard drive (e.g., hardware component 212) represented by that control has a 100 Gigabyte (GB) capacity. The relationship 228b contained in the control definition 226b of the control 240 representing the hard drive indicates that the hard drive is related to the desktop computer represented by the form 238. This relationship 228b links the hard drive instance to the desktop computer instance in the asset management database 206 via a relationship 208. More specifically, a piece of data representing the desktop computer (e.g., a computing device 210) may be linked to, tied to, or related to a piece of data representing the hard drive (e.g., a hardware component 212) in the asset management database 206 via a relationship 208. The control definition 226b of the control instance 240 that represents the hard drive also contains a relationship priority 230b for the relationship between the hard drive and the desktop computer. This relationship priority 230b may be a high-priority relationship, a medium-priority relationship or a low-priority relationship, for example.

The asset management data 232 in the asset management database 206 may thus be related through form definition 224b relationships 228b. More specifically, when a form is designed in the form designer 222, control definitions 226a may be added that tie any instance of the form definition 224a (e.g., an asset) to other asset 210, 212, 214 or item 216 instances in the asset management data 232. Fields included with the control definitions 226a may allow a user to select other assets or items in the asset management data 232 for relational ties to a form instance 238. These relationships 208 may be created dynamically in the asset management database 206 from the form definition 224a-b created in the form designer 222. In one example, a company receives a computer 110a and wants to track who installed or configured it, who received it from the shipping company, what kind of hard drive 112a it has inside and eventually who the computer 110a is assigned to for use. All of this may be represented dynamically using the proper relationships 228a-b and the relationship viewer 236. A user of the web client 234 may navigate between relational assets or items to further view the relationship chain.

When a form definition 224a is designed, the control definition 226a relationship priorities 230a may be set to low, medium or high. When the relationship viewer 236 renders a graphical representation of the asset management data 232, it may represent differing relationship priorities 230a-b through varying line thicknesses. Also, the relationship viewer 236 may include filter buttons (e.g., toggle buttons) that may hide or show any or all of the relationship priorities. In the example above, the person 116 receiving the computer 110a on the dock may have a low-priority relationship, whereas the user 116 assigned to the computer 110a may have a high-priority relationship.

Figure 3:
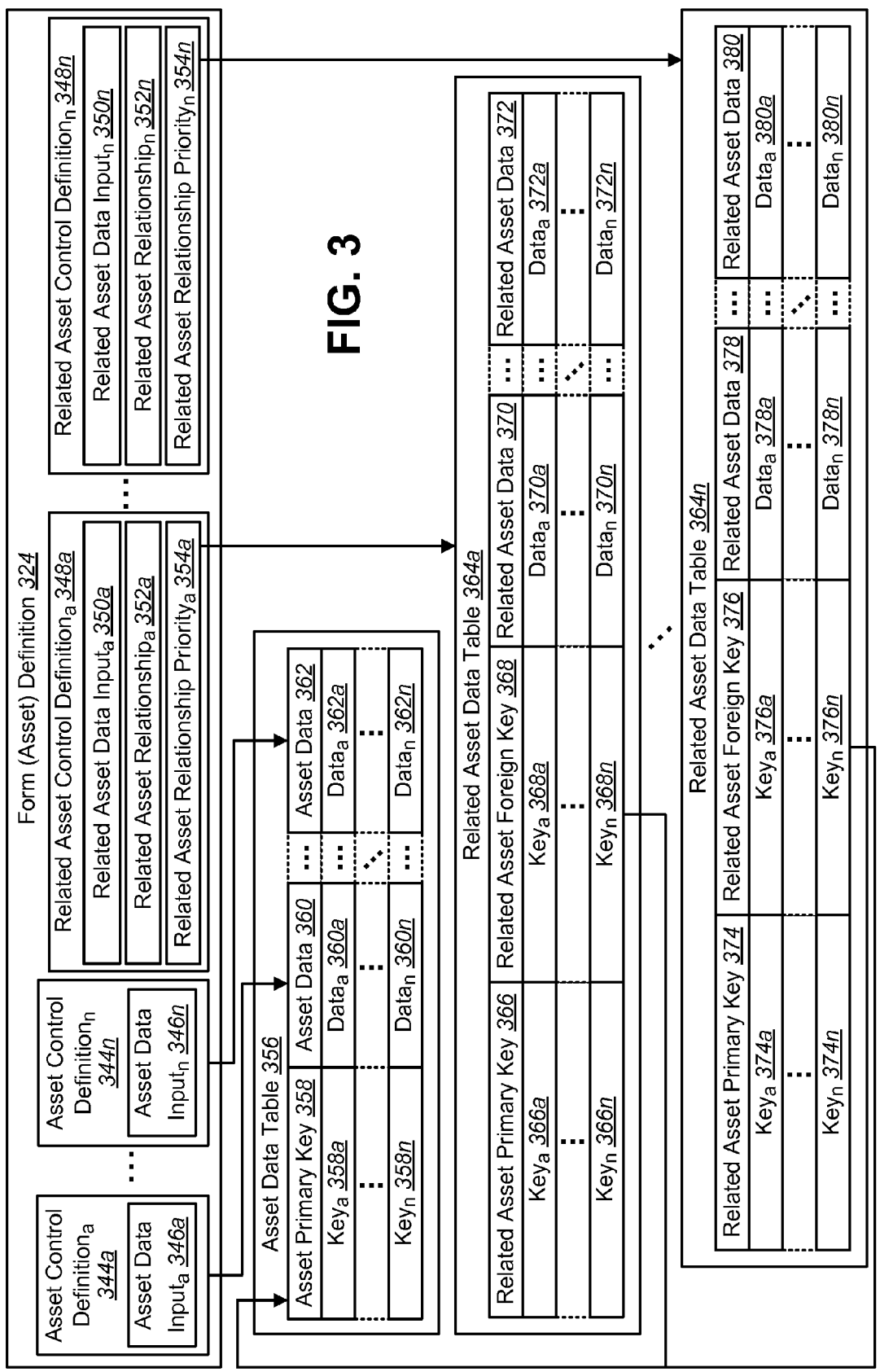
FIG. 3 is a block diagram illustrating a database structure for managing assets on a computing device.

FIG. 3 is a block diagram illustrating a database structure for managing assets on a computing device. An asset management database 206 may include a form definition 324, an asset data table 356 and one or more related asset data tables 364a-n. The form definition 324 may include one or more asset control definitions 344a-n. The asset control definitions 344a-n may each include asset data inputs 346a-n. For example, the asset control definition$_a$ 344a may be a text box control definition that may allow for text input in the asset data input$_a$ 346a.

The form definition 324 may include one or more related asset control definitions 348a-n. The form definition 324 may also include one or more related item control definitions (not shown in FIG. 3) that may be similar to the related asset control definitions 348a-n. The related asset control definitions 348a-n may include related asset data inputs 350a-n, related asset relationships 352a-n, and related asset relationship priorities 354a-n. In one example, the related asset control definition$_a$ 348a is a combo box control definition that allows a user to select an item for input or input a text item. The related asset relationships 352a-n may link the asset data table 356 to related asset data tables 364a-n. The related asset relationship priorities 354a-n may set or define relationship priorities between an asset type represented by the form definition 324 and one or more asset types represented by the related asset controls.

The asset data table 356 may include an asset primary key 358 and asset data 360-362. The asset primary key 358 may include a column of one or more asset primary keys 358a-n. A first column of asset data 360 may include asset data 360a-n. A last column of asset data 362 may include asset data 362a-n. The asset primary keys 358a-n may each be unique identifiers associated with rows of asset data 360a-362a-360n-362n. An asset primary key$_a$ 358a identifies or specifies a row of the asset data table 356 that includes a row from asset data$_a$ 360a (i.e., first column) through asset data$_a$ 362a (i.e., last column). Columns of asset data 360-362 may each include a particular type of asset data. Assuming that the form definition 324 represents desktop computers, for example, a first column of asset data 360 might include the manufacturer name for one or more desktop computers. More specifically, the first row of asset data$_a$ 360a (i.e., first column) specifies that a desktop computer represented by an instance of the form definition 324 was manufactured by a particular manufacturer. Other columns of asset data 360-362 may contain other types of asset data. Some examples of types of asset data 360-362 include asset name, asset type, asset manufacturer, processing speed or other asset attributes.

The related asset data tables 364a-n may include related asset primary keys 366, 374; related asset foreign keys 368, 376; and related asset data 370-372, 378-380. The number of columns in the related asset data tables 364a-n may or may not be the same. The number of rows in the related asset data tables 364a-n may or may not be the same. The related asset primary keys 366a-n, 374a-n may be unique identifiers corresponding to rows of related asset foreign keys 368a-n, 376a-n and rows of related asset data 370a-372a-370n-372n, 378a-380a-378n-380n, respectively.

The foreign keys 368a-n-376a-n may be identifiers that correspond to asset primary keys 358a-n. Duplicates of the foreign keys 368a-n-376a-n may be allowed in the (respective) related asset data tables 364a-n. For example, several of the foreign keys 368a-n in the related asset data table$_a$ 364a may correspond to a single asset primary key$_a$ 358a in the asset data table 356. Thus, several related assets represented in the related asset data table$_a$ 364a may correspond to a single asset in the asset data table 356. For example, several hard drives (i.e., assets) represented in the related asset data table$_a$ 364a may relate to a single desktop computer (i.e., asset) represented in the asset data table 356.

The related asset data 370-372-378-380 in respective related asset data tables 364a-n may contain data about related assets represented by instances of the related asset control definitions 348a-n. Examples of related asset data 370-372-378-380 include dimensions, weight, technical specifications, storage capacity, processor speed, memory capacity, Media Access Control (MAC) address, Internet Protocol (IP) address, manufacturer, power consumption, cost, purchase date, installation date, name, location, status, name of installer/configuration technician, notes, usage, contact information, owner, version, licenses, age, assigned user, cost center, maintenance date, disposal date, purchase approval or other data. The related asset data tables 364a-n may include columns of the related asset data 370-372-378-380 that are input via instances of the form definition 324. However, the related asset data tables 364a-n may include columns of the related asset data 370-372-378-380 that are not input via instances of the form definition 324. Such data that is not input via instances of the form definition 324 may be input via instances of other form definitions or from other sources.

Figure 4:
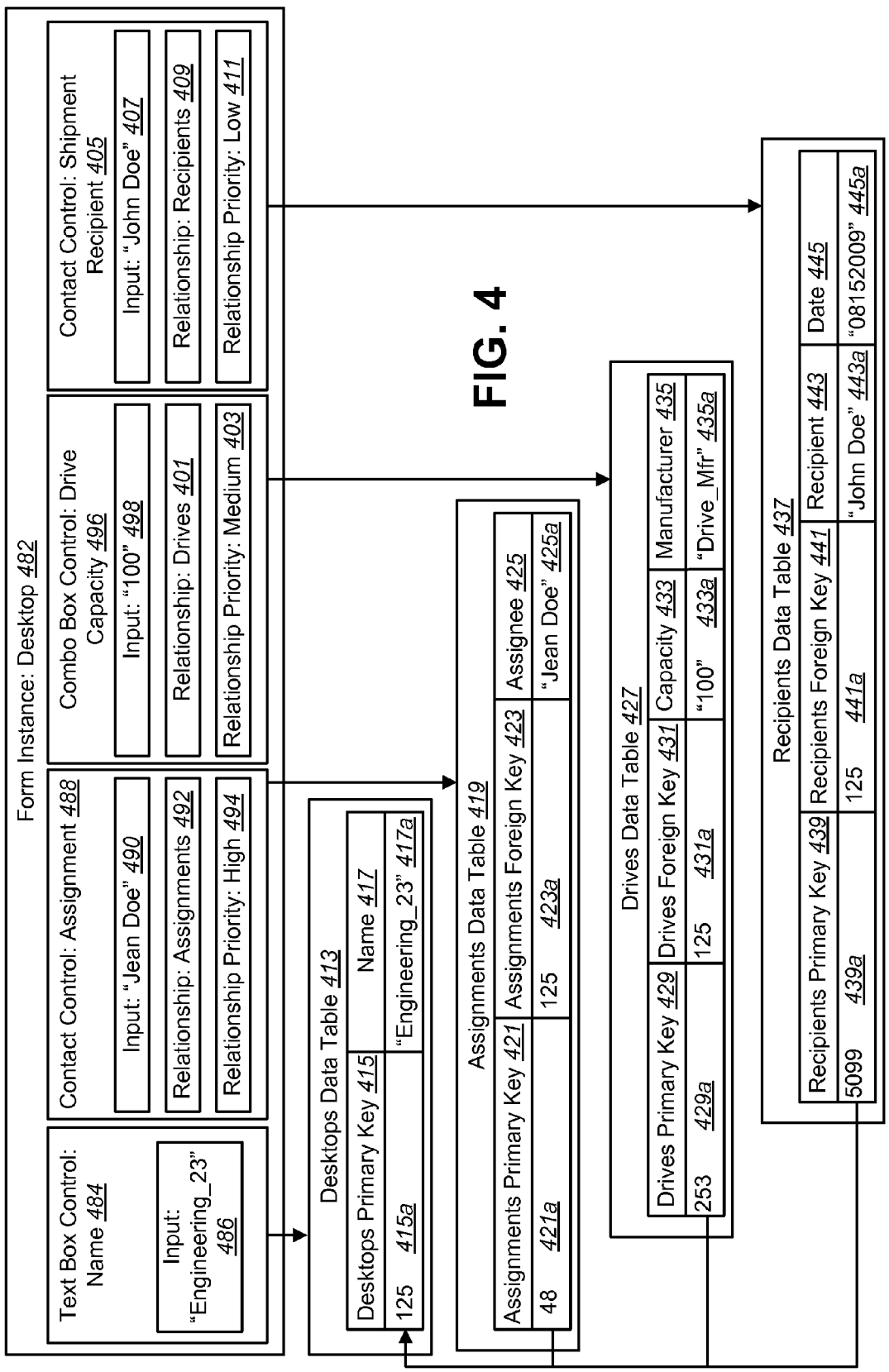
FIG. 4 is a block diagram illustrating one example of a form instance and database structure for managing assets and items on a computing device.

FIG. 4 is a block diagram illustrating one example of a form instance and database structure for managing assets and items on a computing device. In this example, an asset management database 206 includes a form definition 224b for desktop computer assets. The form definition 224b may include several control definitions 226b. For example, the control definitions 226b include a control for desktop names. The control definitions 226b also include related asset and/or item controls for assignments, drives and recipients. A user of a client node computing device 220 may access a form for a desktop computer asset. The asset management computing device 102 may retrieve a form definition 224b for desktop computer assets and send it as a form instance 482 to the client node computing device 220. A user uses the form instance 482 to input information about the particular desktop computer asset. In this example, the user inputs "Engineering_23" 486 in a textbox control 484 for a desktop name. The web client 234 sends the data to the asset management computing device 102, which stores "Engineering_23" 417a as name 417 data in the desktops data table 413. The asset management computing device 102 generates and stores a unique key value of 125 415a as one of the desktops primary keys 415.

The user inputs (e.g., or selects) "Jean Doe" 490 in an assignment contact control 488 for a user (e.g., item 116) assigned to the desktop computer asset. From the form definition 224b, the assignment contact control 488 includes a relationship to assignments 492 and a high relationship priority 494. The web client 234 sends the data to the asset management computing device 102, which stores "Jean Doe" 425a as assignee 425 data in the assignments data table 419. The asset management computing device 102 may generate and store a unique key value of 48 421a as one of the assignment primary keys 421. The asset management computing device 102 also stores 125 423a as one of the assignment foreign keys 423. The assignment foreign key of 125 423a may thus refer to the desktop primary key of 125 415a. Thus, the "Jean Doe" 425a data stored in the assignments data table 419 is linked to the "Engineering_23" 417a data stored in the desktops data table 413 by the asset management computing device 102.

The user inputs (e.g., and/or selects) "100" 498 in a drive capacity (e.g., in GB) combo box control 496 for capacity of a hard drive related to (e.g., installed in) the desktop computer asset. From the form definition 224b, the drive capacity combo box control 496 includes a relationship to drives 401 and a medium relationship priority 403. The web client 234 may send the data to the asset management computing device 102, which stores "100" 433a as capacity 433 data in the drives data table 427. The asset management computing device 102 generates and stores a unique key value of 253 429a as one of the drives primary keys 429. The asset management computing device 102 may also store 125 431a as one of the drives foreign keys 431. The drives foreign key of 125 431a may thus refer to the desktop primary key of 125 415a. Thus, the "100" 433a data stored in the drives data table 427 is linked to the "Engineering_23" 417a data stored in the desktops data table 413 by the asset management computing device 102. The drives data table 427 may also include manufacturer data 435. In this case, "Drive_Mfr" 435a is stored in the drives data table 427. This data may be entered through an instance of a drives form definition. Alternatively or in addition, this data may be entered via an instance of some other asset where a related drives control calls for a drive manufacturer.

The user also inputs (e.g., or selects) "John Doe" 407 in a shipment recipient contact control 405 for the name of an employee who received the desktop computer asset shipment. From the form definition 224*b*, the shipment recipient contact control 405 includes a relationship to recipients 409 and a low relationship priority 411. The web client 234 sends the data to the asset management computing device 102, which stores "John Doe" 443*a* as recipient 443 data in the recipients data table 437. The asset management computing device 102 generates and stores a unique key value of 5099 439*a* as one of the recipients primary keys 439. The asset management computing device 102 also stores 125 441*a* as one of the drives foreign keys 441. The recipients foreign key of 125 441*a* thus refers to the desktop primary key of 125 415*a*. Thus, the "John Doe" 443*a* data stored in the recipients data table 437 is linked to the "Engineering_23" 417*a* data stored in the desktops data table 413 by the asset management computing device 102. The recipients data table 437 may also include date data 445. In this case, "08152009" 445*a* (e.g., Aug. 15, 2009) may be stored in the recipients data table 437. This data may be entered through an instance of a recipients form definition. Alternatively or in addition, this data may be entered via an instance of some other asset where a related recipients control calls for a date.

Figure 5:
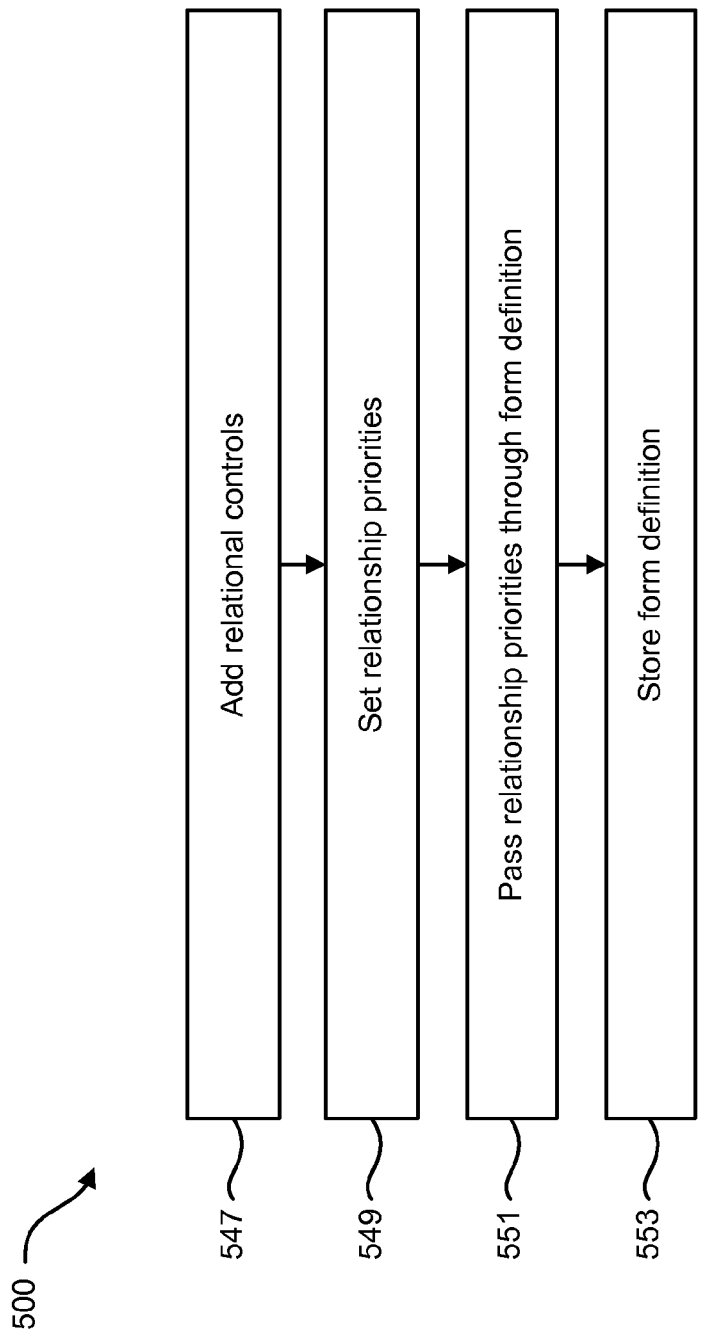
FIG. 5 is a flow diagram illustrating one configuration of a method for managing assets and items on a computing device.

FIG. 5 is a flow diagram illustrating one configuration of a method 500 for managing assets and items on a computing device. An asset management computing device 102 may add 547 relational controls. For example, the asset management computing device 102 adds one or more control definitions 226*a* to a form definition 224*a* where the types of one or more assets and/or items represented by the control definitions 226*a* relate to a type of asset represented by the form definition 224*a*. The relationships 208 between the asset and/or item data may be based on the attributes of each control in a form. The asset management computing device 102 may set 549 relationship priorities 230*a*. For example, the asset management computing device 102 sets 549 each relationship priority 230*a* to high priority, medium priority or low priority. The relationship priorities 230*a* may be fields or attributes of control definitions 226*a*. The asset management computing device 102 might set 549 the relationship priorities 230*a* by setting the field or attribute of each control definition 226*a* to one of the relationship priorities 230*a* (e.g., high, medium or low). These priorities 230*a* may be set at design time.

The asset management computing device 102 may pass 551 the relationship priorities 230*a* through a form definition. That is, the asset management computing device 102 may write the relationship priorities into a form definition 224*b*. More specifically, the asset management computing device 102 writes each control definition 226*a* with its corresponding relationship priority 230*a* into the form definition 224*a*. The asset management device 102 may store 553 the form definition 224*a*. More specifically, the asset management device 102 stores or saves 553 the form definition 224*a* in the asset management database 206. The stored form definition 224*b* may be in XML format, for example. In one configuration, the form definition 224*a* is passed through an Extensible Stylesheet Language Transformation (XSLT) module. The XSLT module may use the form definition 224*a* to dynamically construct asset management database 206 tables for storing asset management data 232.

Figure 6:
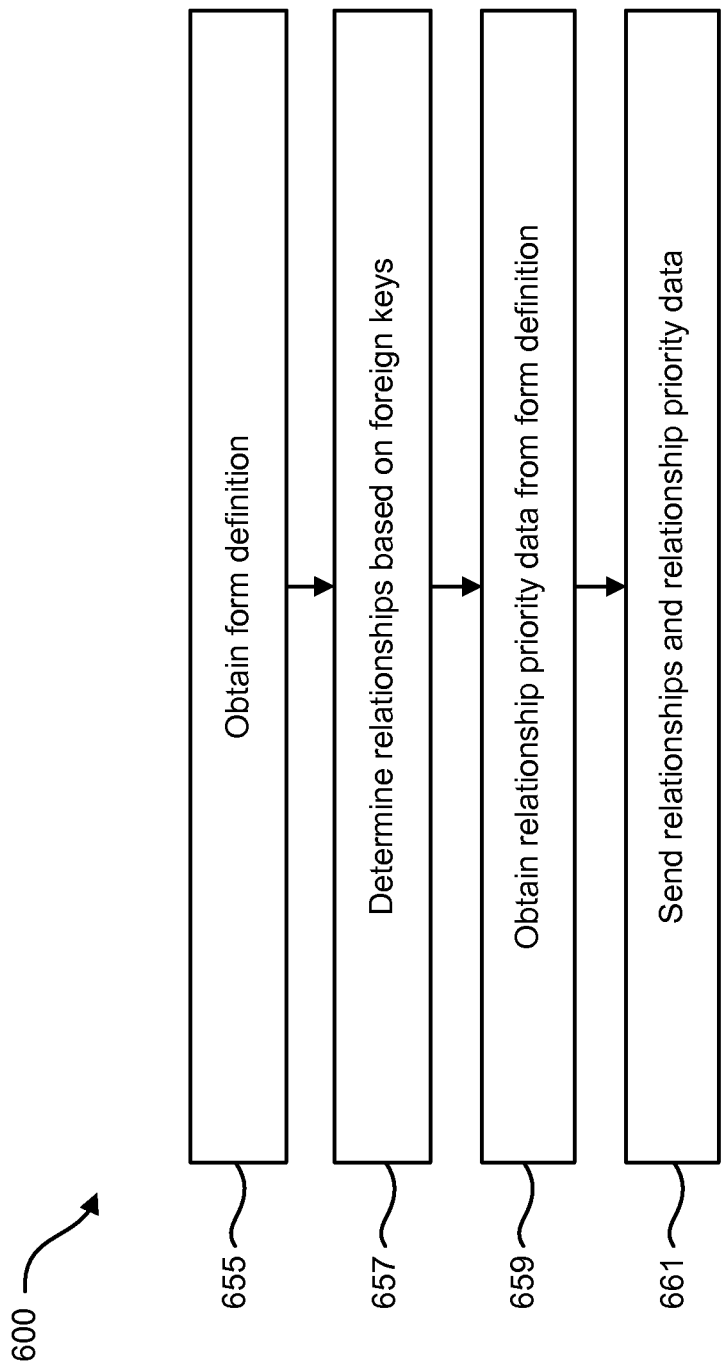
FIG. 6 is a flow diagram illustrating another configuration of a method for managing assets and items on a computing device.

FIG. 6 is a flow diagram illustrating another configuration of a method 600 for managing assets and items on a computing device. An asset management computing device 102 may obtain 655 a form definition. For example, a user of the asset management computing device 102 or the client node computing device 220 accesses a form 238 through a user interface. The asset management computing device 102 may obtain 655 a form definition 224*b* corresponding to a particular asset instance. For example, the asset management computing device 102 may retrieve an instance of the form definition 224*b* from the asset management database 206 corresponding to a particular asset. The asset management computing device 102 may determine 657 relationships based on foreign keys 368, 376. For example, the asset management computing device 102 uses the form definition 224*b* (e.g., control definition relationships 228*b*) and foreign keys 368, 376 (e.g., 423, 431, 441) to build a node map between the asset represented by the form instance and any related assets and/or items. More specifically, the asset management computing device 102 may query the asset management database 206 for assets in related asset data tables 364*a*-*n* (e.g., indicated by the related asset relationships 352*a*-*n* in the form definition 324) having foreign keys 368, 376 matching a particular asset primary key 358 in the asset data table 356. A similar procedure may be followed for building a node map between the asset and related items. The assets and/or items matching the query may be the related assets and/or items. Thus, the asset management computing device 102 may build a node (i.e., asset and/or item) map by determining 657 asset and/or item relationships 208 based on foreign keys.

The asset management computing device 102 may obtain 659 relationship priorities 230*b* from the form definition 224*b*. That is, the asset management computing device 102 retrieves the relationship priority data 230*b* corresponding to related assets or items represented by control definitions 226*b* in the form definition 224*b* representing the asset or item. In other words, the relationship priority 230*b* for each type of related asset or item represented by the control definitions 226*b* is retrieved. The asset management computing device 102 may send 661 relationship and relationship priority data to the client node computing device 220. For example, the asset management computing device 102 sends the data to a client node computing device 220, which stores the asset or item data and corresponding relationship and relationship priority data for rendering on the relationship viewer 236. The relationship viewer 236 may filter the display of differing relationship priorities.

Figure 7:
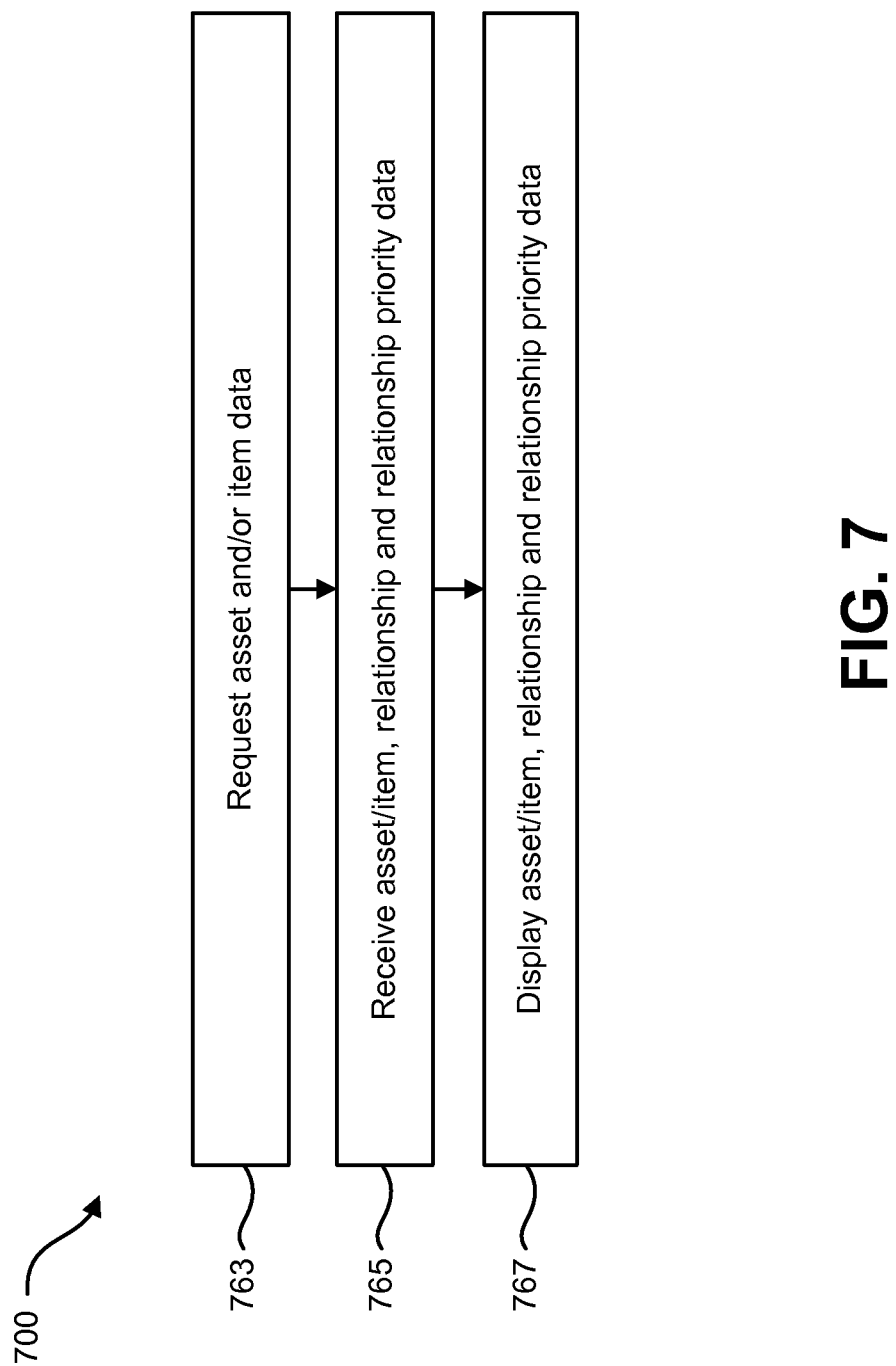
FIG. 7 is a flow diagram illustrating another configuration of a method for managing assets and items on a computing device.

FIG. 7 is a flow diagram illustrating another configuration of a method 700 for managing assets and items on a computing device. A web client 234 may request 763 asset and/or item data. For example, the web client 234 sends a request to the asset management computing device 102. The asset management computing device 102 may retrieve the requested asset/item data, relationship and relationship priority data and send 661 it to the web client 234. The web client 234 may receive 765 asset/item, relationship and relationship priority data. The web client may display 767 the asset/item, relationship, and relationship priority data. For example, the web client 234 renders an asset as an icon on the relationship viewer 236. The web client 234 may also render the related assets/items as icons on the relationship viewer 236. The web client 234 renders the relationships as connectors (e.g., lines, arrows, etc.) between the asset icons and the related asset/item icons. In one configuration, the web client 234 displays 767 the relationship priority data by rendering high-priority relationships as high-thickness connectors, medium-priority relationships as medium-thickness connectors, and low-priority relationships as low-thickness connectors. In one configuration, the web client 234 displays the asset icon and the related asset/item icons in a hub-and-spoke fashion. More specifically, the asset icon is located in the center of the relationship viewer 236 as a "hub," while the related asset/item icons are located in a circular fashion near the edges of the relationship viewer 236 with the relationship (and relationship priority) connectors being displayed as "spokes."

Figure 8:
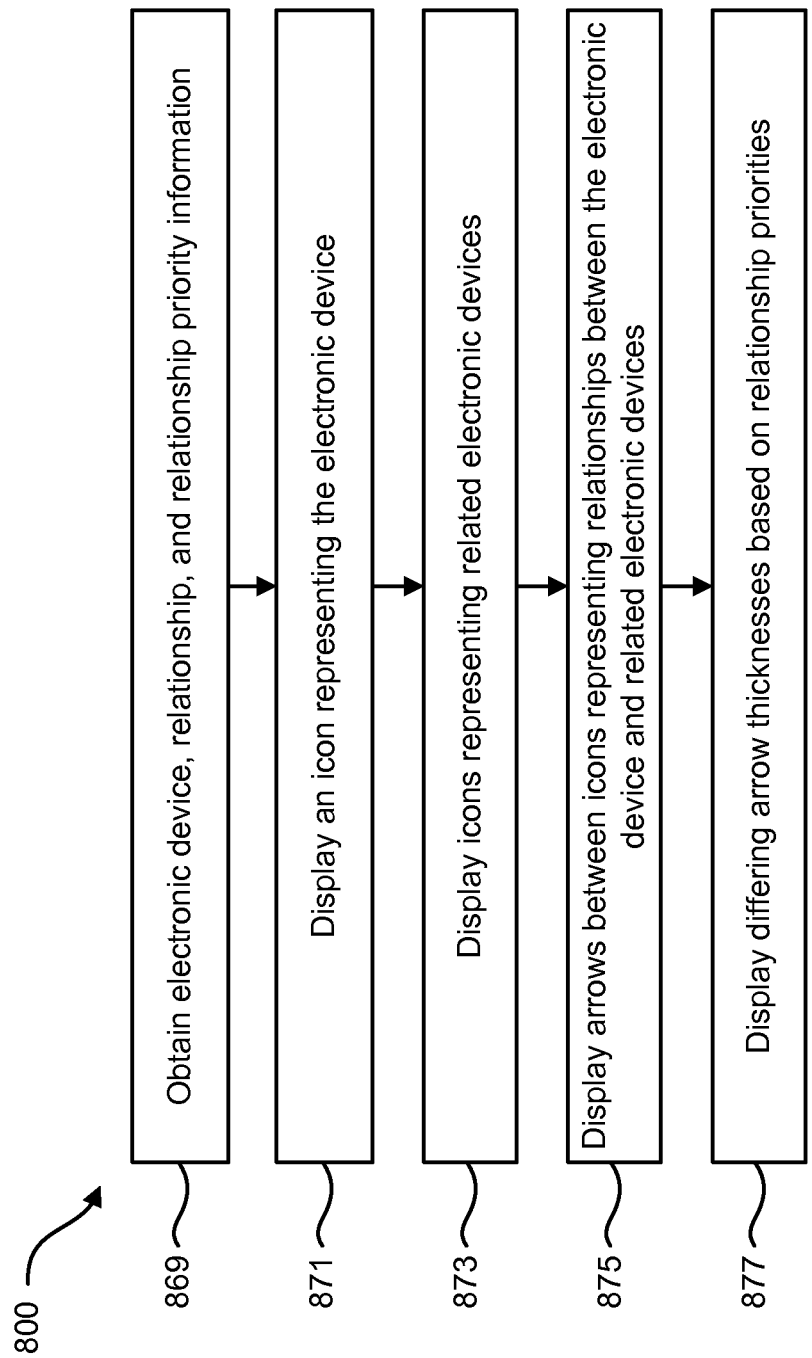
FIG. 8 is a flow diagram illustrating another configuration of a method for managing assets on a computing device.

FIG. 8 is a flow diagram illustrating another configuration of a method 800 for managing assets on a computing device. A web client 234 may obtain 869 electronic device, relationship and relationship priority information. For example, the web client 234 sends a request to the asset management computing device 102 for electronic device, relationship and relationship priority information. More specifically, a user of the web client 234 may send a request or select a particular electronic device (i.e., asset) for viewing. The web client 234 then receives the information. The electronic device relationship information may include data indicating any other electronic devices that are related to the electronic device. That is, the data may indicate relationships between the electronic device and other related electronic devices. The electronic device relationship priority information may indicate a relationship priority for each of the relationships between the electronic device and other related electronic devices. The web client 234 may display 871 an icon representing the electronic device. For example, the web client 234 may display 871 an icon representing the electronic device in the center of the relationship viewer 236.

The web client 234 may display 873 icons representing related electronic devices. In one configuration, the web client 234 displays icons representing related electronic devices in a circular fashion near the edges of the relationship viewer 236. The web client 234 may display 875 arrows between the electronic device icon and the related electronic device icons representing relationships between the electronic device and related electronic devices. Thus, the electronic device icon, the related electronic device icons and the connectors are displayed in a "hub-and-spoke" arrangement where the electronic device icon is the "hub", and the connectors are the "spokes" connecting the electronic device icon to the related device icons.

The web client 234 may display 877 differing arrow thicknesses based on corresponding relationship priorities. For example, the web client 234 may display each arrow representing a high-priority relationship as a high-thickness arrow, each arrow representing a medium-priority relationship as a medium-thickness arrow, and each arrow representing a low-priority relationship as a low-thickness arrow. Although an example of a "hub-and-spoke" arrangement is given herein, other arrangements of icons and connectors may be used. For example, the web client 234 may display the electronic device icon, the related electronic device icons and the connectors in a "tree," hierarchical or "parent-child" arrangement. In that arrangement, the electronic device icon may be displayed near the top of the relationship viewer 236, while the related electronic device icons and connectors may be displayed branching out toward the bottom of the relationship viewer 236. In one configuration, a limited number of relationship levels are displayed. For example, only the current node's "parent" and "child" nodes may be displayed at a time, where additional relationship levels (e.g., children's child nodes, parents' parent node(s), etc.) are displayed or accessible by navigating to a parent or a child node. In other configurations, more or fewer relationship levels may be displayed.

Figure 9:
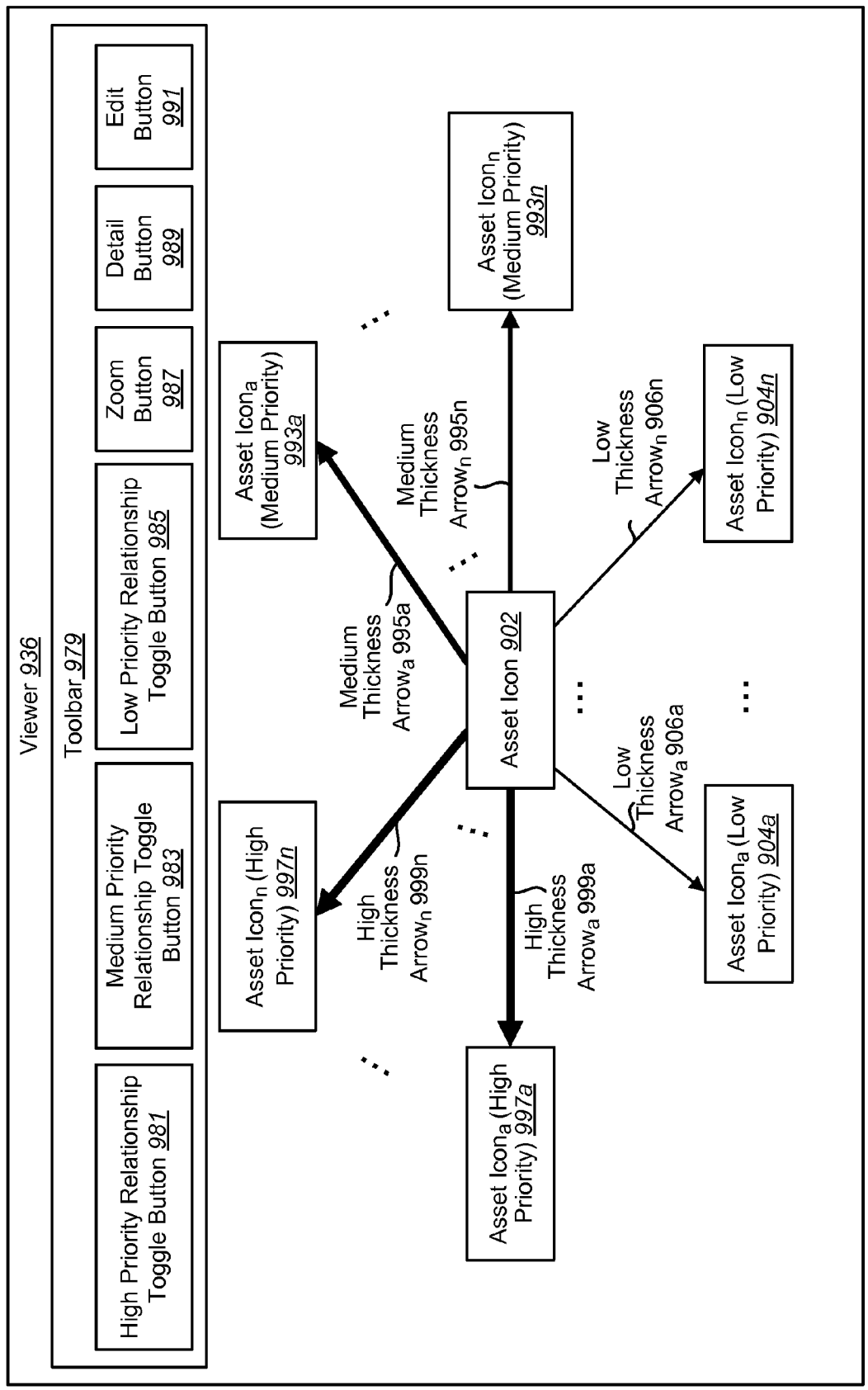
FIG. 9 is a block diagram illustrating one configuration of a relationship viewer.

FIG. 9 is a block diagram illustrating one configuration of a relationship viewer 936. In one configuration, the relationship viewer 936 renders graphics or data using Adobe® FLEX® or HTML. The relationship viewer 936 may include a toolbar 979. The relationship viewer 936 may display an asset icon 902, asset icons (high priority) 997*a-n*, asset icons (medium priority) 993*a-n*, asset icons (low priority) 904*a-n*, high-thickness connectors 999*a-n*, medium-thickness connectors 995*a-n* and low-thickness connectors 906*a-n*. The asset icons (high priority) 997*a-n* may be icons that represent related assets that have a high-priority relationship with the asset represented by the asset icon 902. Furthermore, the medium priority asset icons 993*a-n* may represent related assets that have a medium-priority relationship with the asset represented by the asset icon 902. Finally, the low-priority asset icons 904*a-n* may represent related assets that have a low-priority relationship with the asset represented by the asset icon 902.

High-priority relationships may be represented by high-thickness connectors 999*a-n* (i.e., between the asset represented by the asset icon 902 and the assets represented by the high-priority asset icons 997*a-n*). Additionally, medium-thickness connectors 995*a-n* may each represent a medium-priority relationship between the asset represented by the asset icon 902 and the assets represented by the medium-priority asset icons 993*a-n*. Finally, low-priority relationships may be represented by low-thickness connectors 906*a-n* (i.e., between the asset represented by the asset icon 902 and the assets represented by the low-priority asset icons 904*a-n*). Although each type of asset icon 997*a-n*, 993*a-n*, 904*a-n* and each type of connector 999*a-n*, 995*a-n*, 906*a-n* are shown in FIG. 9 as occupying separate areas of the relationship viewer 936, the different types of asset icons 997*a-n*, 993*a-n*, 904*a-n* and connectors 999*a-n*, 995*a-n*, 906*a-n* may be interspersed among each other.

The toolbar 979 may include a high-priority relationship toggle button 981, a medium-priority relationship toggle button 983, a low-priority relationship toggle button 985, a zoom button 987, a detail button 989 and an edit button 991. The high-priority relationship toggle button 981 may toggle the display of high-priority asset icons 997*a-n* and high-thickness connectors 999*a-n*. That is, the high-priority relationship toggle button 981 may hide or show high-priority asset icons 997*a-n* and high-thickness connectors 999*a-n* when clicked. Similarly, the medium-priority relationship toggle button 983 may toggle the display of medium-priority asset icons 993*a-n* and medium-thickness connectors 995*a-n* (e.g., when clicked). Additionally, the display of low-priority asset icons 904*a-n* and low-thickness connectors 906*a-n* may be toggled when the low-priority relationship toggle button 985 is clicked. The priority toggle buttons 981, 983, 985 may represent "filter levels" that allow filtering (e.g., selective viewing) of the relationship priorities that are displayed by the viewer 936.

The zoom button 987 may magnify the view of a region of the relationship viewer 936. For example, the zoom button 987 may magnify a selected region of the relationship viewer 936 when clicked. The detail button 989 may allow a user to access or view details on a particular node. For example, the detail button 989 may open a display window including more information about the asset represented by the asset icon 902. This may include, for example, details about "child" assets (e.g., a hard drive for a desktop computer) represented by the asset icons 904*a-n*, 993*a-n*, 997*a-n* and other details relating to the asset represented by the asset icon 902. It should be noted that similar information may be displayed at the occurrence of some other event, such as a "mouse over" event for the asset icon 902. The edit button 991 may allow a user to select and edit data associated with the assets 997a-n, 993a-n, 904a-n. For example, the edit button 991 may open a form 238 for a user to input data for a selected asset when clicked.

Figure 10:
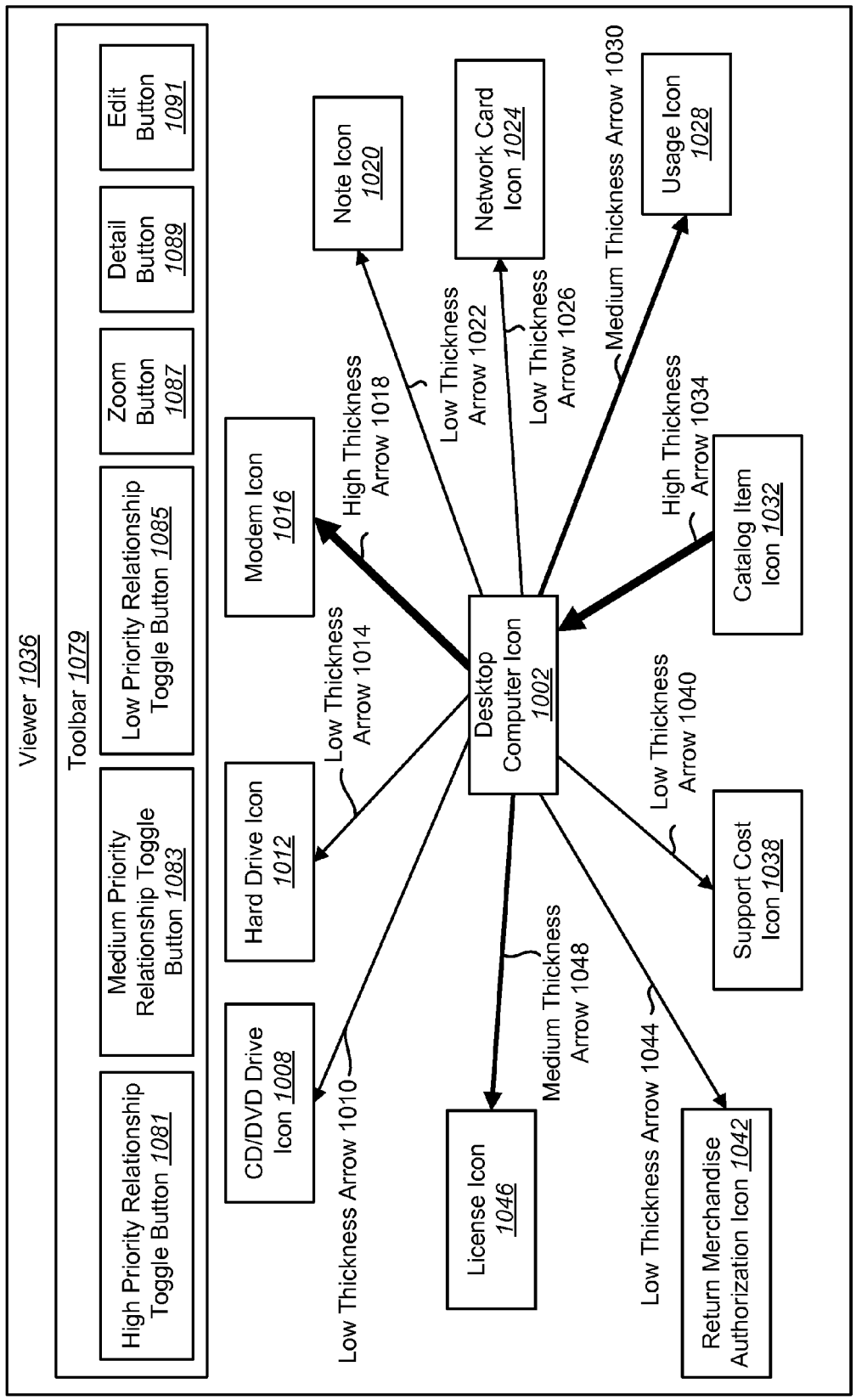
FIG. 10 is a block diagram illustrating an example of a relationship viewer.

FIG. 10 is a block diagram illustrating an example of a relationship viewer 1036. The relationship viewer 1036 may include a toolbar 1079. The relationship viewer 1036 may display a desktop computer icon 1002. In this example, the desktop computer icon 1002 represents an instance of a desktop computer asset owned by an entity 100. The relationship viewer 1036 displays (icons representing) instances of assets and other items that are related to the desktop computer represented by the desktop computer icon 1002. In this example, the desktop computer represented by the desktop computer icon 1002 is related to several assets and other items represented by icons. For example, the relationship viewer 1036 displays a (Compact Disc/Digital Video Disc) CD/DVD drive icon 1008, hard drive icon 1012, modem icon 1016, note icon 1020, network card icon 1024, usage icon 1028, catalog item icon 1032, support cost icon 1038, Return Merchandise Authorization (RMA) icon 1042 and license icon 1046.

The modem icon 1016 and the catalog item icon 1032 each have high-thickness arrows 1018, 1034 between them and the desktop computer icon 1002, indicating that the modem and the catalog item each have high-priority relationships with the desktop computer. Additionally, the license icon 1046 and usage icon 1028 each have medium-thickness arrows 1048, 1030 indicating that the license and the usage each have medium-priority relationships with the desktop computer. The remainder of the icons (i.e., CD/DVD drive 1008, hard drive 1012, note 1020, network card 1024, support cost 1038 and Return Merchandise Authorization 1042) each have low-thickness arrows 1010, 1014, 1022, 1026, 1040, 1044 indicating low-priority relationships between the devices or items and the desktop computer. The direction of the arrows 1010, 1014, 1018, 1022, 1026, 1030, 1034, 1040, 1044, 1048 may indicate which electronic device or item is the "parent" of another. For example, the arrows 1010, 1014, 1018, 1022, 1026, 1030, 1040, 1044, 1048 pointing away from the desktop computer icon 1002 indicate that the electronic devices or items represented by their respective icons 1008, 1012, 1016, 1020, 1024, 1028, 1038, 1042, 1046 are "children" in relation to the "parent" desktop computer. On the other hand, the arrow 1034 pointing from the catalog item icon 1032 to the desktop computer icon 1002 indicates that the catalog item represented by the catalog item icon 1032 is a "parent" to the desktop computer represented by the desktop computer icon 1002.

In this example, the toolbar 1079 includes a high-priority relationship toggle button 1081, a medium-priority relationship toggle button 1083, a low-priority relationship toggle button 1085, a zoom button 1087, a detail button 1089 and an edit button 1091. In this example, the high-priority relationship toggle button 1081 toggles the display of the high-priority icons (i.e., modem 1016 and catalog item 1032) and their corresponding high-thickness arrows 1018, 1034. Additionally, the medium-priority relationship toggle button 1083 toggles the display of the license icon 1046 and usage icon 1028 along with their corresponding medium-thickness arrows 1048, 1030 when clicked. Similarly, the display of the low-priority icons (i.e., CD/DVD drive 1008, hard drive 1012, note 1020, network card 1024, support cost 1038, Return Merchandise Authorization 1042) and their corresponding low-thickness arrows 1010, 1014, 1022, 1026, 1040, 1044 are toggled when the low-priority relationship toggle button 1085 is clicked. In this example, FIG. 10 illustrates a graphical relationship view with all of the relationship priorities displayed (i.e., none of the icons or arrows are "hidden").

The zoom button 1087 may magnify the view of a region of the relationship viewer 1036. The detail button 1089 may allow a user to view more detail corresponding to an icon (e.g., desktop computer icon 1002). The edit button 1091 may allow a user to select and/or edit data associated with the electronic devices or items represented by the icons 1008, 1012, 1016, 1020, 1024, 1028, 1032, 1038, 1042, 1046.

Figure 11:
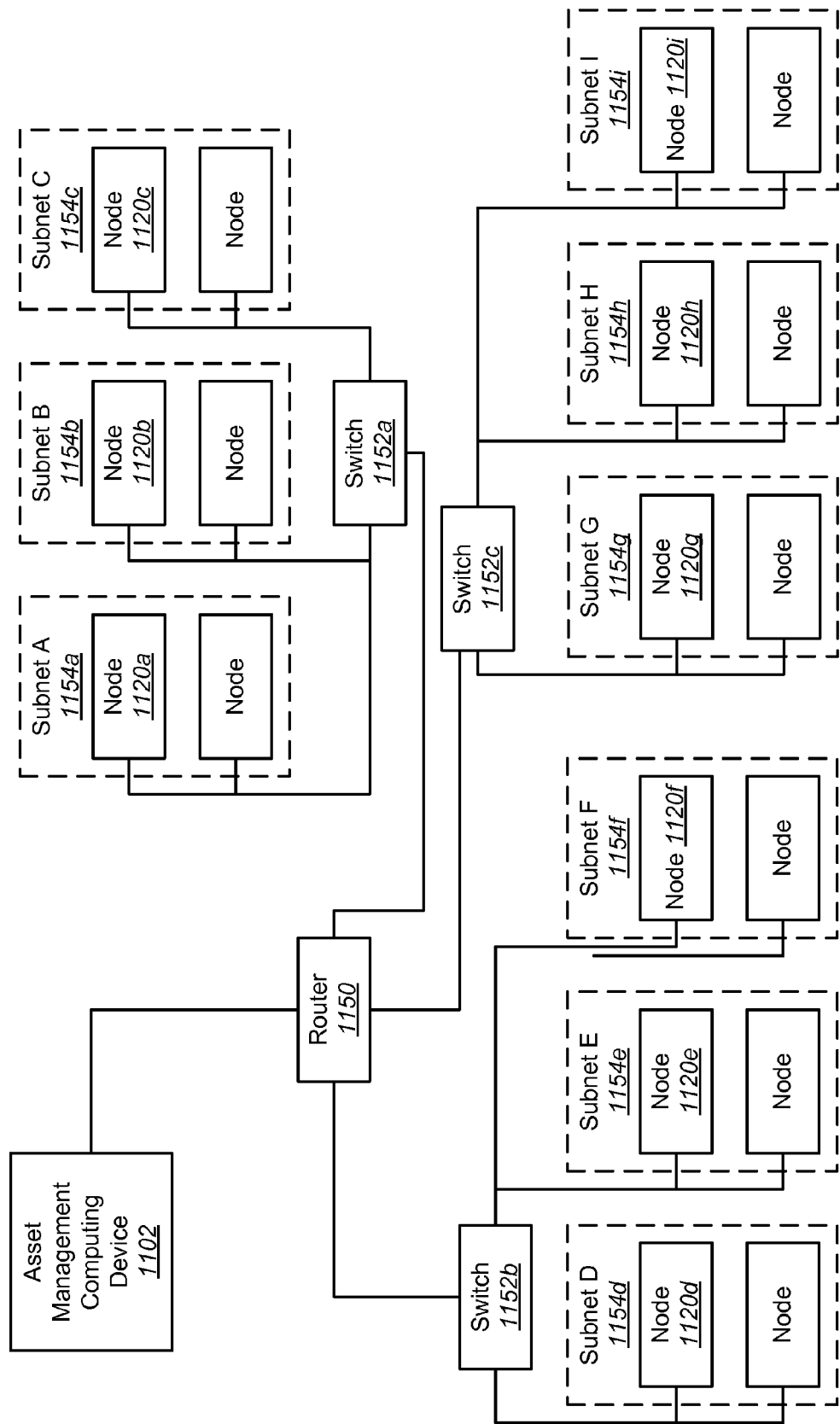
FIG. 11 is a block diagram that illustrates one configuration of a network where systems and methods for managing assets and items on a computing device may be implemented.

FIG. 11 is a block diagram that illustrates one configuration of a network where a system for managing assets on a computing device may be implemented. An asset management computing device 1102 is connected to a router 1150. The router 1150 is connected to switches 1152a, 1152b, 1152c. The switch 1152a is connected to several nodes 1120a, 1120b, 1120c, etc. via their respective subnets 1154a, 1154b, 1154c. The switch 1152b is connected to several nodes 1120d, 1120e, 1120f, etc. via their respective subnets 1154d, 1154e, 1154f. The switch 1152c is connected to several nodes 1120g, 1120h, 1120i, etc. via their respective subnets 1154g, 1154h, 1154i. Although FIG. 11 only shows one router 1150 and a limited number of switches 1152, subnets 1154 and nodes 1120, many and varied numbers of routers 1150, switches 1152, subnets 1154 and nodes 1120 may be included in networks and/or systems where a system for managing assets on a computing device may be implemented.

Figure 12:
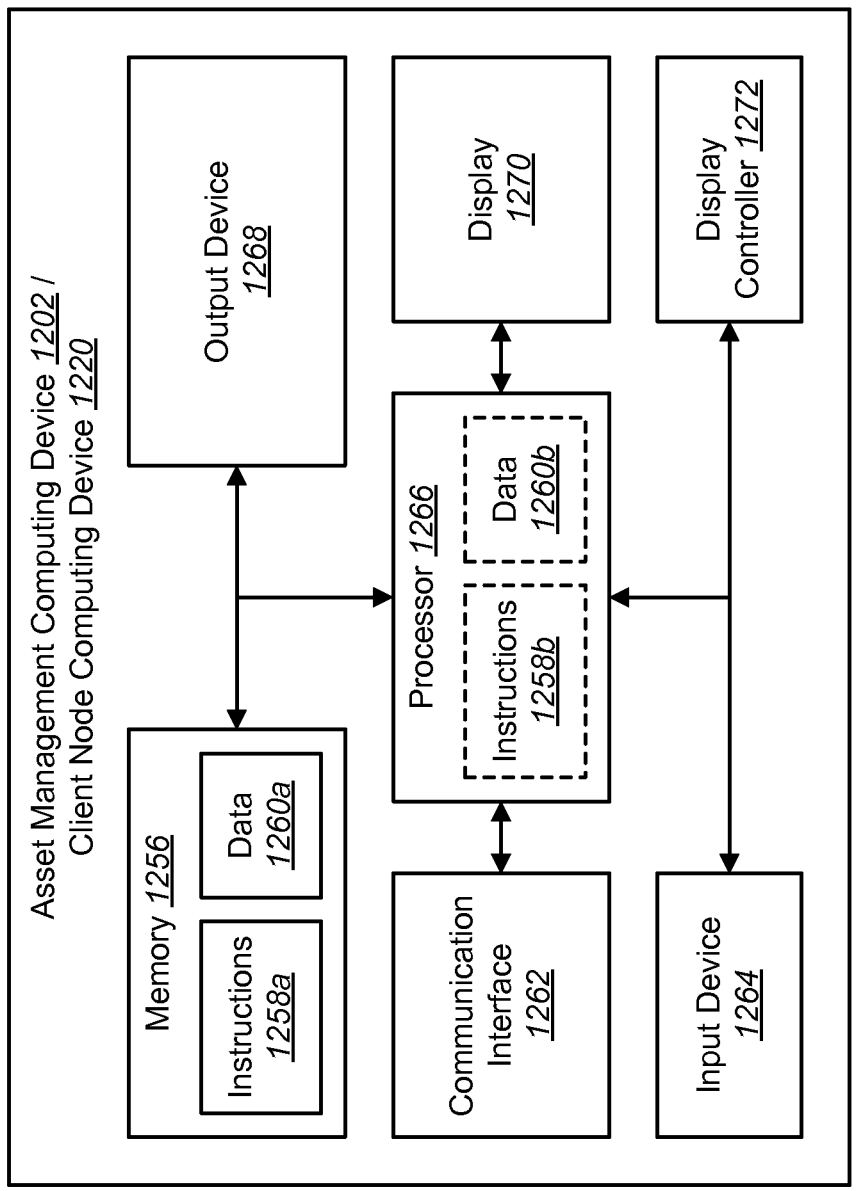
FIG. 12 illustrates various components of a computing device.

FIG. 12 illustrates various components that may be utilized in an asset management computing device 1202 and/or a client node computing device 1220. The illustrated components may be located within the same physical structure or in separate housings or structures.

The asset management computing device 1202 and/or client node computing device 1220 may include a processor 1266 and memory 1256. The memory 1256 may include instructions 1258a and data 1260a. The processor 1266 controls the operation of the asset management computing device 1202 and/or client node computing device 1220 and may be embodied as a microprocessor, a microcontroller, a digital signal processor (DSP) or other device known in the art. The processor 1266 typically performs logical and arithmetic operations based on program instructions 1258b and/or data 1260b stored (1258a, 1260a) within the memory 1256.

The asset management computing device 1202 and/or client node computing device 1220 typically may include one or more communication interfaces 1262 for communicating with other electronic devices. The communication interfaces 1262 may be based on wired communication technology, wireless communication technology, or both. Examples of different types of communication interfaces 1262 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The asset management computing device 1202 and/or client node computing device 1220 typically may include one or more input devices 1264 and one or more output devices 1268. Examples of different kinds of input devices 1264 include a keyboard, mouse, microphone, remote control device, button, joystick, trackball, touchpad, lightpen, etc. Examples of different kinds of output devices 1268 include a speaker, printer, etc. One specific type of output device which may be typically included in a computer system is a display device 1270. Display devices 1270 used with embodiments disclosed herein may utilize any suitable image projection technology, such as a cathode ray tube (CRT), liquid crystal display (LCD), light-emitting diode (LED), gas plasma, electroluminescence, or the like. A display controller 1272 may also be provided for converting data stored in the memory 1256 into text, graphics and/or moving images (as appropriate) shown on the display device 1270.

Of course, FIG. 12 illustrates only one possible configuration of an asset management computing device 1202 and/or client node computing device 1220. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices or any other medium that can be used to carry or store desired program code in the form of instructions or data structures and that can be accessed by a computer. A computer-readable medium may be tangible and non-transitory. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for managing assets on a computing device comprising a processor and memory, the method comprising:
    obtaining, by the computing device from another computing device over a computer network, one or more relationships between an electronic device and one or more related electronic devices, a Return Merchandise Authorization (RMA), a support cost for the electronic device, and at least one software license;
    obtaining, by the computing device, one or more relationship priorities of the one or more relationships, wherein each of the one or more relationship priorities are selected from a group consisting of high, medium and low, and wherein each of the one or more relationship priorities are obtained from a form definition representing the electronic device, wherein the electronic device comprises a computer, wherein the form definition includes a control definition representing a hard drive, and wherein an associated relationship defines a relationship between data representing the computer and data representing the hard drive, and wherein the form definition further includes a contact control definition comprising a Lightweight Directory Access Protocol (LDAP) control;
    displaying, by the computing device, an icon representing the electronic device;

displaying, by the computing device, an icon for each of the one or more related electronic devices, the RMA, the support cost for the electronic device, and the at least one software license;

displaying, by the computing device, one or more arrows that connect icons and represent the one or more relationships, wherein each of the one or more arrows is displayed with a high thickness if a corresponding relationship priority is high, a medium thickness if a corresponding relationship priority is medium and a low thickness if a corresponding relationship priority is low; and toggling display of one or more of the icons, comprising hiding all related electronic device icons, RMA icons, support cost icons, and software license icons with a medium-priority relationship in response to a user clicking a medium-priority relationship toggle button while displaying all high and low priority relationship icons.

2. The method of claim 1, wherein the one or more arrows are displayed between the icon representing the electronic device and the one or more icons representing the one or more related electronic devices.

3. The method of claim 1, wherein the one or more arrows point toward the icon representing the electronic device and away from the one or more icons representing the one or more related electronic devices if the electronic device is a child of the one or more related electronic devices, and wherein the one or more arrows point away from the icon representing the electronic device and toward the one or more icons representing the one or more related electronic devices if the electronic device is a parent of the one or more related electronic devices.

4. The method of claim 1, further comprising:
toggling the display of one or more of the one or more arrows representing the one or more relationships based on the one or more relationship priorities.

5. The method of claim 1, wherein the icon representing the electronic device, the one or more arrows and the one or more icons representing the one or more related electronic devices are displayed in a hub-and-spoke arrangement wherein the icon representing the electronic device is displayed centrally and the one or more icons representing the related electronic devices are displayed peripherally with the one or more arrows being displayed between the icon representing the electronic device and the one or more icons representing the one or more related electronic devices.

6. The method of claim 1, further comprising:
obtaining, by the computing device, data about the electronic device; and
displaying, by the computing device, the data about the electronic device.

7. The method of claim 1, further comprising:
obtaining, by the computing device, data about the one or more related electronic devices; and
displaying, by the computing device, the data about the one or more related electronic devices.

8. A method for managing assets on a computing device comprising a processor and memory, the method comprising:
adding, by the computing device, one or more relational controls, each relational control comprising a relationship and a relationship priority between electronic devices and between at least one software license, to a form definition representing an electronic device, wherein the electronic device comprises a computer, wherein the form definition includes a control definition representing a hard drive, and wherein an associated relationship defines a relationship between data representing the computer and data representing the hard drive, and wherein the form definition further includes a contact control definition comprising a Lightweight Directory Access Protocol (LDAP) control;

setting, by the computing device, a relationship priority for each of the one or more relational controls, wherein a relationship priority between the electronic device and a software license is low, medium or high priority;

passing, by the computing device, the relationship priority for each of the one or more relational controls through the form definition;

storing, by the computing device, the form definition in an Extensible Markup Language (XML) format; and dynamically constructing asset management database tables for storing asset management data using Extensible Stylesheet Language Transformation (XSLT).

9. The method of claim 8, further comprising generating a database schema based on the form definition and the one or more relational controls.

10. The method of claim 9, wherein generating a database schema comprises generating database tables based on the form definition and the one or more relational controls.

11. The method of claim 9, wherein generating a database schema comprises generating links between database tables based on the form definition and the one or more relational controls.

12. A method for managing assets on a computing device comprising a processor and memory, the method comprising:
obtaining, by the computing device, a form definition in an Extensible Markup Language (XML) format representing an electronic device, wherein the electronic device comprises a computer, wherein the form definition includes a control definition representing a hard drive, and wherein an associated relationship defines a relationship between data representing the computer and data representing the hard drive, and wherein the form definition further includes a contact control definition comprising a Lightweight Directory Access Protocol (LDAP) control;

determining, by the computing device, relationships based on foreign keys, wherein at least one relationship is for at least one software license, wherein the determining relationships comprises building a node map by querying an asset management database for assets in related asset data tables having foreign keys matching a particular asset primary key in an asset data table, wherein the related asset data tables comprise a name of a person that installed related assets;

obtaining, by the computing device, relationship priorities from the form definition for each type of related electronic device; and sending, by the computing device, relationships and relationship priorities.

13. A computing device that is configured for managing assets on a computing device, comprising:
a processor;
memory in electronic communication with the processor;
instructions stored in the memory, the instructions being executable to:
obtain from another computing device over a computer network one or more relationships between an electronic device and one or more related electronic devices, a Return Merchandise Authorization (RMA), a support cost for the electronic device, and at least one software license;
obtain one or more relationship priorities of the one or more relationships, wherein each of the one or more relationship priorities are selected from a group consisting of high, medium and low, and wherein each of the one or more relationship priorities are obtained from a form definition representing the electronic device, wherein the electronic device comprises a computer, wherein the form definition includes a control definition representing a hard drive, and wherein an associated relationship defines a relationship between data representing the computer and data representing the hard drive, and wherein the form definition further includes a contact control definition comprising a Lightweight Directory Access Protocol (LDAP) control;
display an icon representing the electronic device;
display an icon for each of the one or more related electronic devices, the RMA, the support cost for the electronic device, and the at least one software license;
display one or more arrows that connect icons and represent the one or more relationships, wherein each of the one or more arrows is displayed with a high thickness if a corresponding relationship priority is high, a medium thickness if a corresponding relationship priority is medium and a low thickness if a corresponding relationship priority is low; and
toggle display of one or more of the icons, comprising hiding all related electronic device icons, RMA icons, support cost icons, and software license icons with a medium-priority relationship in response to a user clicking a medium-priority relationship toggle button while displaying all high and low priority relationship icons.

14. The computing device of claim 13, wherein the one or more arrows are displayed between the icon representing the electronic device and the one or more icons representing the one or more related electronic devices.

15. The computing device of claim 13, wherein the one or more arrows point toward the icon representing the electronic device and away from the one or more icons representing the one or more related electronic devices if the electronic device is a child of the one or more related electronic devices, and wherein the one or more arrows point away from the icon representing the electronic device and toward the one or more icons representing the one or more related electronic devices if the electronic device is a parent of the one or more related electronic devices.

16. The computing device of claim 13, wherein the instructions are further executable to:
toggle the display of one or more of the one or more arrows representing the one or more relationships based on the one or more relationship priorities.

17. The computing device of claim 13, wherein the icon representing the electronic device, the one or more arrows, and the one or more icons representing the one or more related electronic devices are displayed in a hub-and-spoke arrangement wherein the icon representing the electronic device is displayed centrally and the one or more icons representing the related electronic devices are displayed peripherally with the one or more arrows being displayed between the icon representing the electronic device and the one or more icons representing the one or more related electronic devices.

18. The computing device of claim 13, wherein the instructions are further executable to:
obtain data about the electronic device; and
display the data about the electronic device.

19. The computing device of claim 13, wherein the instructions are further executable to:
obtain data about the one or more related electronic devices; and
display the data about the one or more related electronic devices.

20. A computing device that is configured for managing assets on a computing device, comprising:
a processor;
memory in electronic communication with the processor;
instructions stored in the memory, the instructions being executable to:
add one or more relational controls, each relational control comprises a relationship and a relationship priority between electronic devices and between at least one software license, to a form definition representing an electronic device, wherein the electronic device comprises a computer, wherein the form definition includes a control definition representing a hard drive, and wherein an associated relationship defines a relationship between data representing the computer and data representing the hard drive, and wherein the form definition further includes a contact control definition comprising a Lightweight Directory Access Protocol (LDAP) control;
set a relationship priority for each of the one or more relational controls, wherein a relationship priority between the electronic device and a software license is low, medium or high priority;
pass the relationship priority for each of the one or more relational controls through the form definition;
store the form definition in an Extensible Markup Language (XML) format; and
dynamically construct asset management database tables for storing asset management data using Extensible Stylesheet Language Transformation (XSLT).

21. The computing device of claim 20, wherein the instructions are further executable to generate a database schema based on the form definition and the one or more relational controls.

22. The computing device of claim 21, wherein generating a database schema comprises generating database tables based on the form definition and the one or more relational controls.

23. The computing device of claim 21, wherein generating a database schema comprises generating links between database tables based on the form definition and the one or more relational controls.

24. A computing device that is configured for managing assets on a computing device, comprising:
a processor;
memory in electronic communication with the processor;
instructions stored in the memory, the instructions being executable to:
obtain a form definition in an Extensible Markup Language (XML) format representing an electronic device, wherein the electronic device comprises a computer, wherein the form definition includes a control definition representing a hard drive, and wherein an associated relationship defines a relationship between data representing the computer and data representing the hard drive, and wherein the form definition further includes a contact control definition comprising a Lightweight Directory Access Protocol (LDAP) control;

determine relationships based on foreign keys, wherein at least one relationship is for at least one software license, wherein the determining relationships comprises building a node map by querying an asset management database for assets in related asset data tables having foreign keys matching a particular asset primary key in an asset data table, wherein the related asset data tables comprise a name of a person that installed related assets;

obtain relationship priorities from the form definition for each type of related electronic device; and send relationships and relationship priorities.

25. A non-transitory tangible computer-readable storage medium for managing assets on a computing device comprising executable instructions for:

obtaining from another computing device over a computer network one or more relationships between an electronic device and one or more related electronic devices, a Return Merchandise Authorization (RMA), a support cost for the electronic device, and at least one software license;

obtaining one or more relationship priorities of the one or more relationships, wherein each of the one or more relationship priorities are selected from a group consisting of high, medium and low, and wherein each of the one or more relationship priorities are obtained from a form definition representing the electronic device, wherein the electronic device comprises a computer, wherein the form definition includes a control definition representing a hard drive, and wherein an associated relationship defines a relationship between data representing the computer and data representing the hard drive, and wherein the form definition further includes a contact control definition comprising a Lightweight Directory Access Protocol (LDAP) control;

displaying an icon representing the electronic device;

displaying an icon for each of the one or more related electronic devices, the RMA, the support cost for the electronic device, and the at least one software license;

displaying one or more arrows that connect icons and represent the one or more relationships, wherein each of the one or more arrows is displayed with a high thickness if a corresponding relationship priority is high, a medium thickness if a corresponding relationship priority is medium and a low thickness if a corresponding relationship priority is low; and toggling display of one or more of the icons, comprising hiding all related electronic device icons, RMA icons, support cost icons, and software license icons with a medium-priority relationship in response to a user clicking a medium-priority relationship toggle button while displaying all high and low priority relationship icons.

26. A non-transitory tangible computer-readable storage medium for managing assets on a computing device comprising executable instructions for:

adding one or more relational controls, each relational control comprising a relationship and a relationship priority between electronic devices and between at least one software license, to a form definition representing an electronic device, wherein the electronic device comprises a computer, wherein the form definition includes a control definition representing a hard drive, and wherein an associated relationship defines a relationship between data representing the computer and data representing the hard drive, and wherein the form definition further includes a contact control definition comprising a Lightweight Directory Access Protocol (LDAP) control;

setting a relationship priority for each of the one or more relational controls, wherein a relationship priority between the electronic device and a software license is low, medium or high priority;

passing the relationship priority for each of the one or more relational controls through the form definition;

storing the form definition in an Extensible Markup Language (XML) format; and dynamically constructing asset management database tables for storing asset management data using Extensible Stylesheet Language Transformation (XSLT).

27. A non-transitory tangible computer-readable storage medium for managing assets on a computing device comprising executable instructions for:

obtaining a form definition in an Extensible Markup Language (XML) format representing an electronic device, wherein the electronic device comprises a computer, wherein the form definition includes a control definition representing a hard drive, and wherein an associated relationship defines a relationship between data representing the computer and data representing the hard drive, and wherein the form definition further includes a contact control definition comprising a Lightweight Directory Access Protocol (LDAP) control;

determining relationships based on foreign keys, wherein at least one relationship is for at least one software license, wherein the determining relationships comprises building a node map by querying an asset management database for assets in related asset data tables having foreign keys matching a particular asset primary key in an asset data table, wherein the related asset data tables comprise a name of a person that installed related assets;

obtaining relationship priorities from the form definition for each type of related electronic device; and sending relationships and relationship priorities.

* * * * *